United States Patent [19]

Kobayashi et al.

[11] Patent Number: 4,477,881
[45] Date of Patent: Oct. 16, 1984

[54] METHOD OF RETRIEVING AND EDITING DISTRIBUTED INFORMATION

[75] Inventors: Nobuhisa Kobayashi, Katsuta; Kinji Mori, Kawasaki; Hirokazu Ihara, Machida; Katuaki Ikeda, Kashiwa, all of Japan

[73] Assignee: Hitachi, Ltd., Tokyo, Japan

[21] Appl. No.: 327,193

[22] Filed: Dec. 3, 1981

[30] Foreign Application Priority Data

Dec. 10, 1980 [JP] Japan ................................ 55-173260

[51] Int. Cl.$^3$ ............................................ G06F 15/16
[52] U.S. Cl. .............................. 364/900; 340/825.05; 370/86
[58] Field of Search ........................... 364/900; 178/3; 340/825.05; 370/86

[56] References Cited

U.S. PATENT DOCUMENTS 3,652,993  3/1972  Bridwell et al. ............... 340/825.05
4,227,178  10/1980  Gergaud et al. .................. 370/86 X Primary Examiner—Raulfe B. Zache
Attorney, Agent, or Firm—Antonelli, Terry & Wands

[57] ABSTRACT

A method of retrieving and editing distributed information, in which one of a plurality of equipment units connected to a common signal transmission line issues or originates a request to retrieve data information distributed among and stored in respective files of the other equipment units and to edit the distributed data information. The above-mentioned one equipment unit sends to the transmission line a retrieval request message containing retrieval information necessary to retrieve distributed data information. Each of the equipment units storing therein distributed data information receives the retrieval request message from the transmission line, and the files are retrieved on the basis of the retrieval information to retrieve the distributed data information. The data information retrieved in at least a first one of the equipment units storing therein the distributed data information is sent to the transmission line. This data information retrieved in the first equipment unit is received by at least two of the other equipment units through the transmission line for editing. These two other equipment units edit both the received data information from the first equipment unit and data information retrieved in these two equipment units, and then send the edited data information to the transmission line.

14 Claims, 19 Drawing Figures

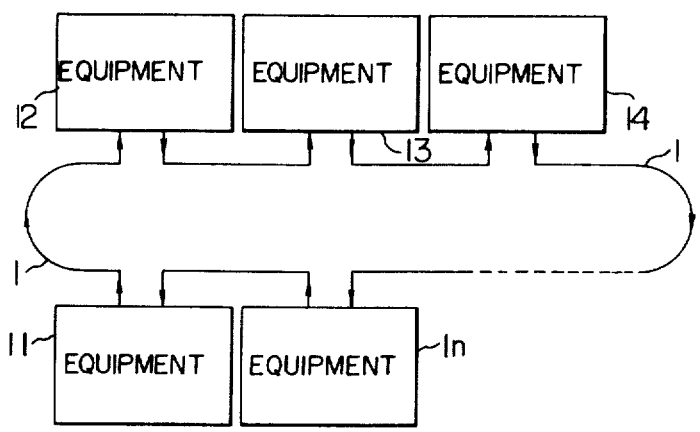
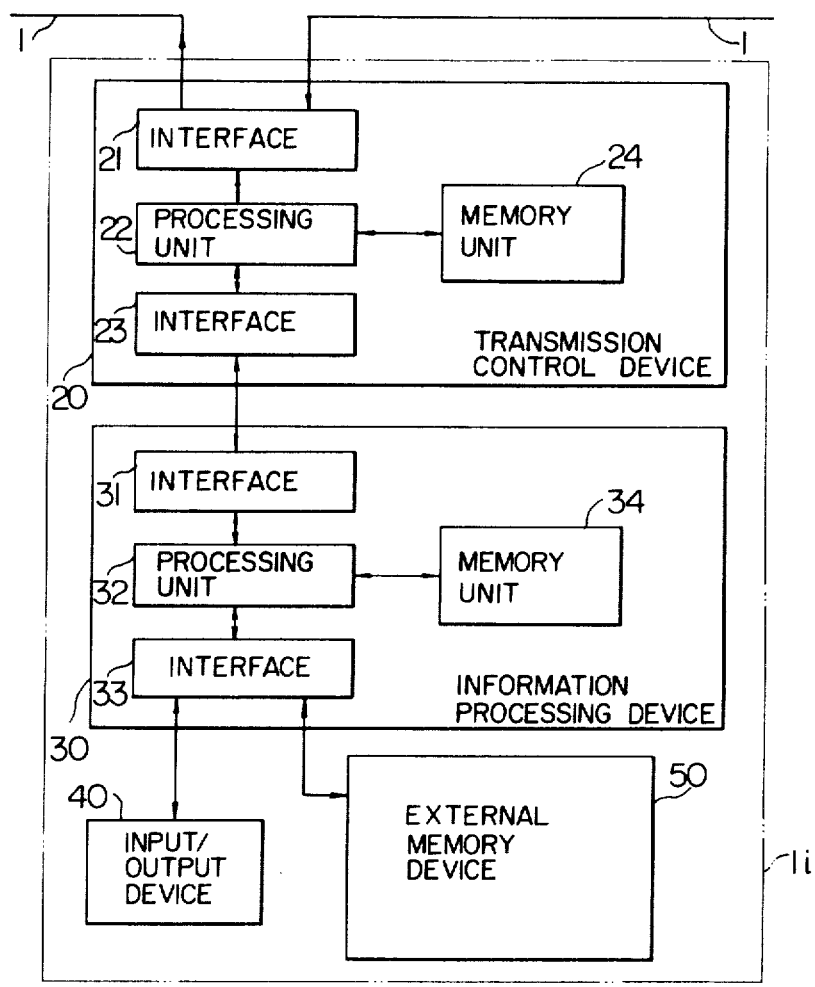

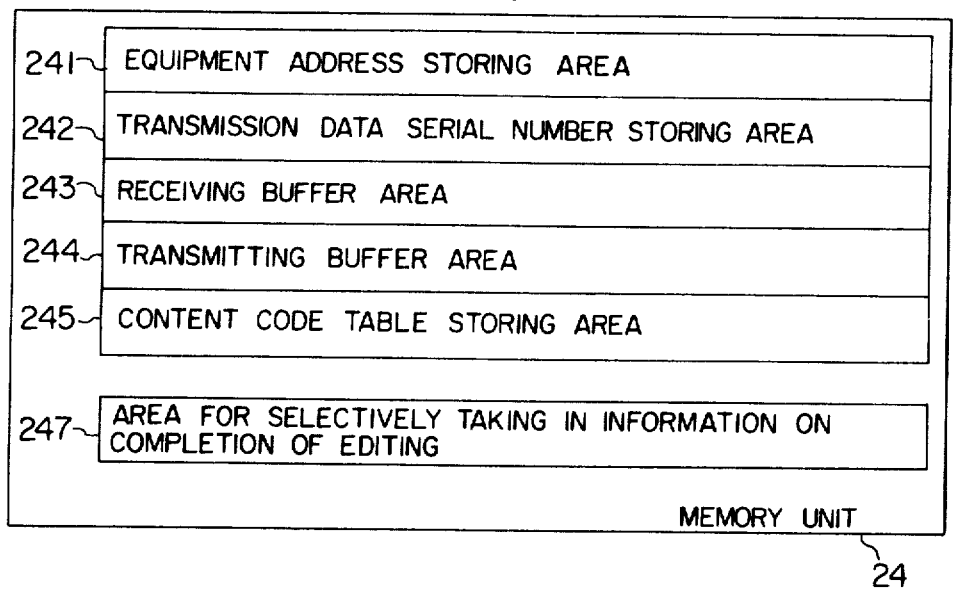
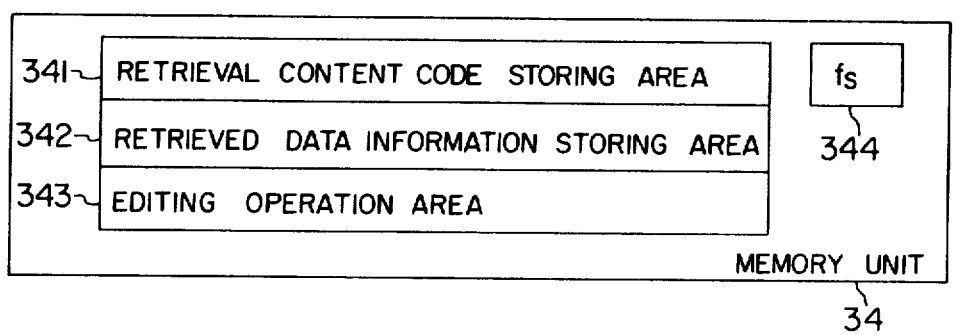

FIG. 6
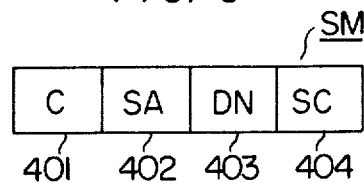
FIG. 9
| EQUIPMENT NO. | CONTENT CODE | CONNECTION INFORMATION | | DATA |
|---|---|---|---|---|
| | | LEFT END | RIGHT END | |
| 12 | C | FN | $f_B$ | $D_A$ |
| 13 | C | $f_A$ | $f_C$ | $D_B$ |
| 14 | C | $f_C$ | FN | $D_C$ |
FIG. 10
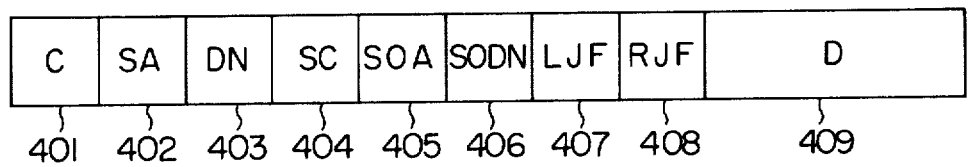

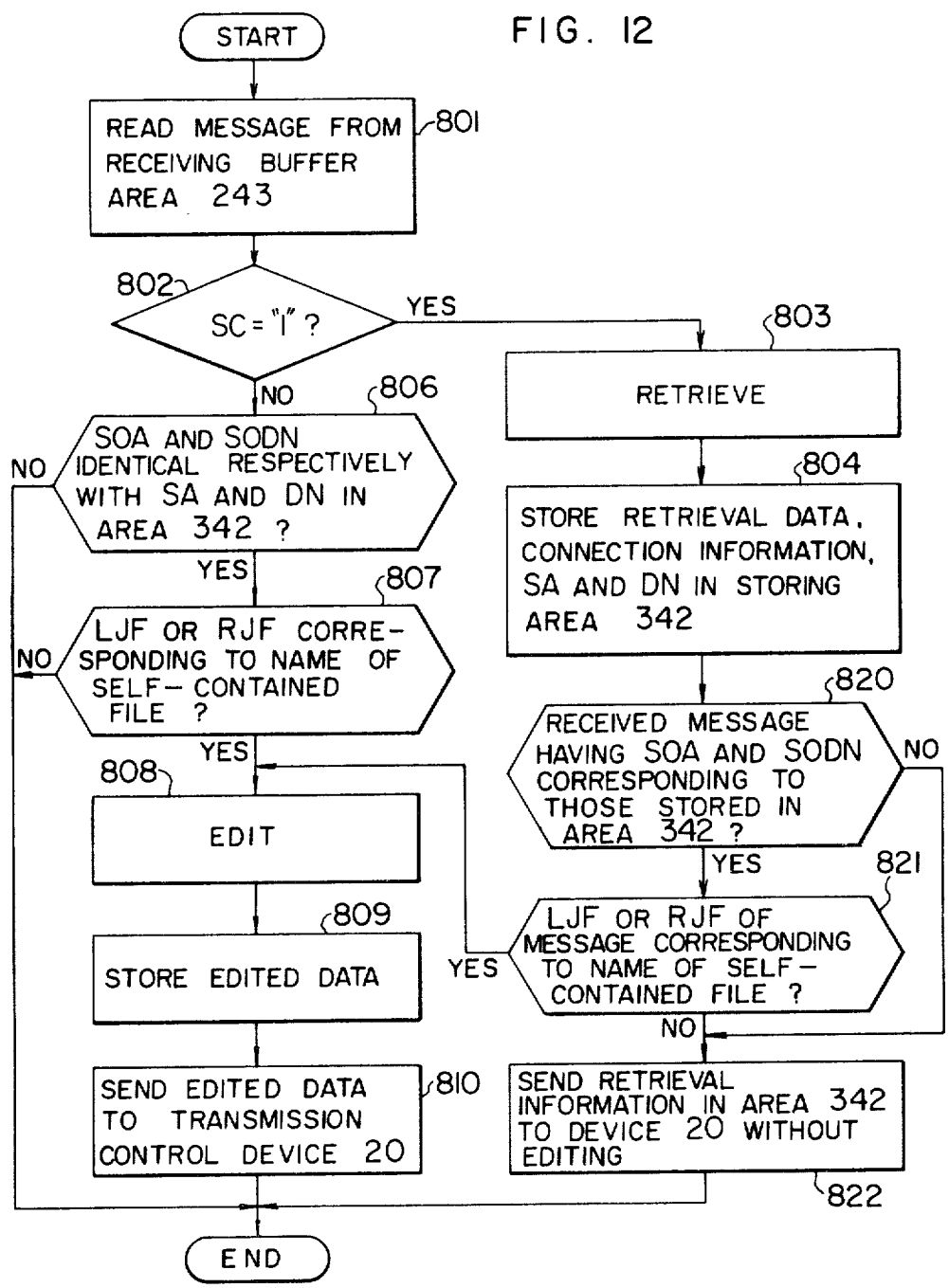

METHOD OF RETRIEVING AND EDITING DISTRIBUTED INFORMATION

BACKGROUND OF THE INVENTION

1. Field of the Invention

The present invention relates to a method of retrieving and editing information which is distributed among and stored in a plurality of equipment units connected to a common signal transmission line. Explanation will be made herein of the case where a loop transmission line is used as the common signal transmission line, by way of example.

2. Description of the Prior Art

In conventional systems, a retrieval requesting equipment unit sends retrieval information to a loop transmission line, other equipment units receiving the retrieval information retrieve their own files to retrieve data information, the retrieved data information is sent to the retrieval requesting equipment through the loop transmission line, and the data information thus sent is edited in the retrieval requesting equipment.

Accordingly, the above-mentioned conventional systems have a drawback that much load is concentrated upon the retrieval requesting equipment when the data information is edited.

SUMMARY OF THE INVENTION

An object of the present invention is to provide a method of retrieving and editing distributed information free from the drawback of the conventional systems, in which editing is carried out distributively in the respective equipment units.

According to the present invention, one of a plurality of equipment units connected to a common signal transmission line sends a retrieval requesting message which contains information for use in retrieval (namely, retrieval information), to the common signal transmission line in order to retrieve and edit data information which is distributed among and stored in respective files of the other equipment units. Each of the equipment units storing therein distributed data information retrieves its own file for distributed data information upon receiving the retrieval requesting message from the common signal transmission line, and at least a first one of the equipment units storing therein distributed data information sends data information which has been retrieved from its own file to the common signal transmission line. The data information retrieved in the first equipment unit is received from the common signal transmission line by at least two other equipment units storing therein distributed data information to edit the received data information and data information retrieved in the above-mentioned two equipment units and to send edited data information to the common signal transmission line.

BRIEF DESCRIPTION OF THE DRAWINGS

FIG. 1 shows the whole construction of a loop transmission system.

FIG. 2 is a block diagram showing a structure of each of the equipment units making up the system shown in FIG. 1.

FIG. 3 shows memory areas included in the memory unit 24 shown in FIG. 2.

FIG. 4 shows memory areas included in the memory unit 34 shown in FIG. 2.

FIG. 5 shows a file structure in the external memory device 50 shown in FIG. 2.

FIG. 6 shows a structure of a retrieval requesting message.

FIG. 9 shows a part of a file structure in each equipment shown in FIG. 2.

FIG. 10 shows a structure of a message with data.

FIG. 12 is another flow chart for explaining the processing steps in the information processing device 30 shown in FIG. 2.

DESCRIPTION OF THE PREFERRED EMBODIMENTS

Figure 7A:
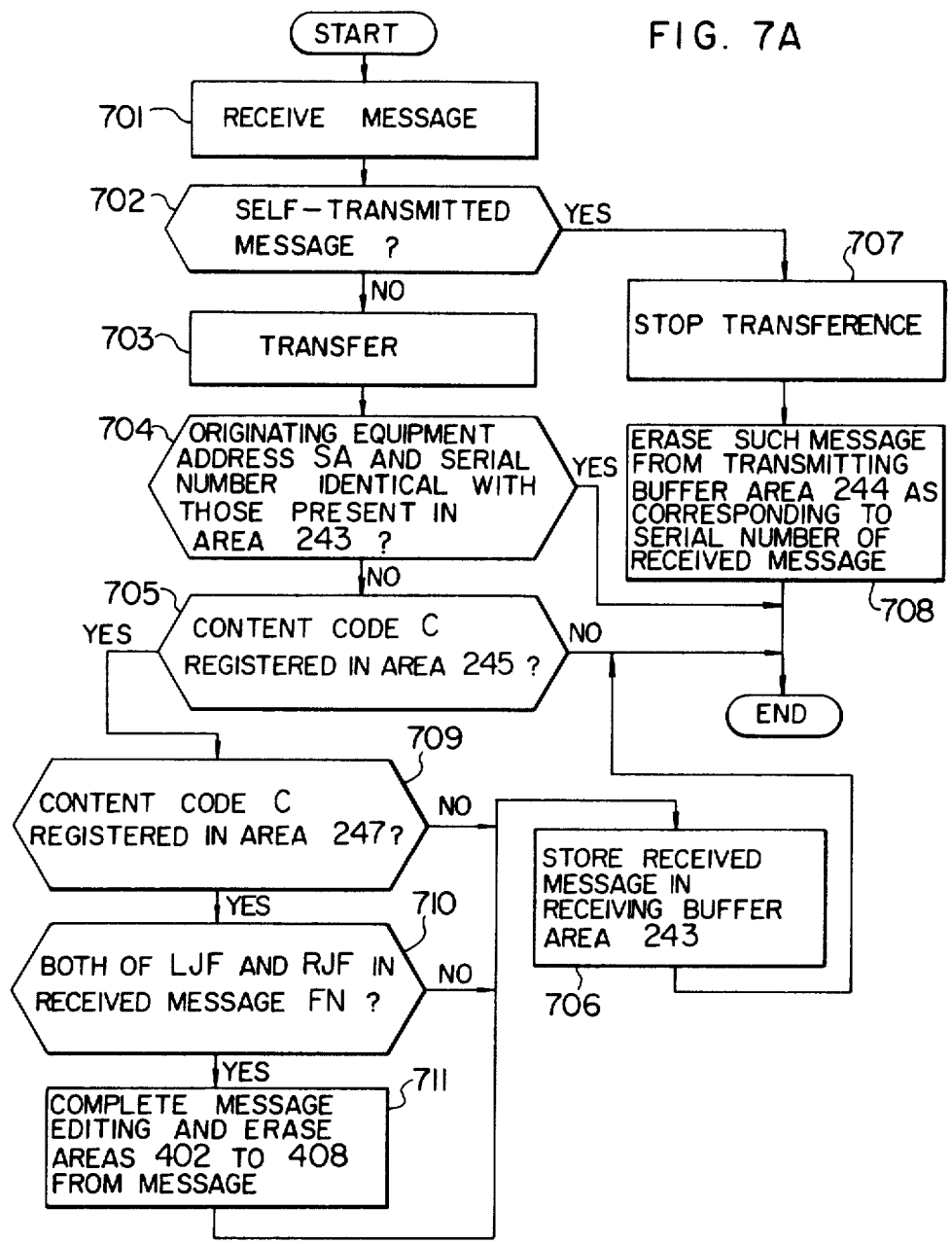
FIGS. 7A and 7C are flow charts for explaining various processing steps in the transmission control device 20 shown in FIG. 2.

The present invention will be explained below in detail, on the basis of embodiments thereof.

FIG. 1 shows a loop transmission system to which the present invention is applied, and in which n equipments 11, 12, . . . and 1n are connected to a unidirectional transmission loop acting as a common signal transmission line.

FIG. 2 is a block diagram showing a structure of the i-th equipment 1$i$. The remaining equipment units have the same structure as the equipment units 1$i$.

Referring to FIG. 2, each of the above equipment units is made up of a transmission control device 20, an information processing device 30, an input/output device 40, and an external memory device 50. The transmission control device 20 includes interfaces 21 and 23, a processing unit 22 and a memory unit 24. The interface 21 may be, for example, MC 6854, and the processing unit 22 may be, for example, an 8-bit microcomputer M6802. Further, the interface 23 may be, for example, a PIA (Peripheral Interface Adapter) HD 46821.

The information processing device 30 includes interfaces 31 and 33, a processing unit 32 and a memory unit 34. Each of the interfaces 31 and 33 may be, for example, a PIA HD 46821, and the processing unit 32 may be, for example, a microcomputer M 6802.

In order to facilitate the understanding of an operation according to the present invention, the operation is divided into the following parts, that is, (1) retrieval request processing, (2) retrieval processing, (3) editing processing, and (4) data editing completion data receiving processing.

Now, explanation will be made on each of the above processing operations.

(1) Retrieval Request Processing

In the present embodiment, a retrieval request is processed in a simplified manner as mentioned below.

That is, a retrieval requesting equipment unit sends to all of the other equipment units only a code that is obtained by classifying retrieval requests in accordance with the contents thereof (referred to hereinafter as a "content code" and explained later in more detail), without being informed of distribution of data among other equipment units. At this time, the content code is sent without having any address of each of receiving equipment units. In each of the other equipment units, it is decided whether the retrieval request is forwarded to the equipment unit, on the basis of whether the content code has been previously stored in the equipment unit. In other words, the retrieval requesting equipment unit does not send the content code to each of the other equipment units separately, but sends the content code only once to request other equipment units to retrieve the distributed data.

The above-mentioned content code is a code assigned to one of a plurality of subsets which are obtained by dividing data on the basis of the common concept characterizing each subset. That is, one code is assigned to one retrieval item. Accordingly, when a retrieval operation is carried out on the basis of a content code, all data having a common concept corresponding to the content code can be simultaneously retrieved from the equipment units. Now, let us consider a train operation supervising system, in which a train pursuit file provided in each station is retrieved for the train number of a train which is behind a normal time defined by a train diagram, by way of example.

A monitor center always watches the running state of each train, and issues a traffic control command in response to delay of a train. For example, when a train is a predetermined time or more behind schedule, the operation of a plurality of trains is adjusted in order to prevent the delay from spreading and to restore the running state of the delayed train to a normal state defined by a train diagram. Referring to FIGS. 1 and 2 of the accompanying drawings, when it is broadcast from a station that a train is a predetermined time or more behind schedule, a processing equipment unit 11 in the monitor center takes in the above-mentioned data, and displays this data on an input/output device 40. An operator inputs a traffic control command to the processing equipment unit 11 to the input/output device 40 on the basis of the above data. When supplied with the traffic control command, a processing unit 32 gathers the delay information with respect to each train, and delivers a train diagram, an operation control program and a display program from an external memory device 50. Further, the operation control program is executed on the basis of the train diagram to make operation control fundamental data. Furthermore, each station is informed of the fact that the operation control will be effected after this time, and is required to prepare for the operation control. When the delay information of each train is sent to and edited in the processing unit 32, a way of operating each train is determined on the basis of data thus edited and the operation control fundamental data. The above-mentioned way of operating each train is reported to each station, and simultaneously displayed on the input/output device 40.

As mentioned above, when a train is behind schedule, the load of the monitor center increases rapidly due to the processing necessary for the operation control. According to the present invention, however, the editing of delay information with respect to each train is shared by a plurality of stations, so that load is distributed uniformly to respective stations.

In the above-mentioned case, a delayed train retrieval command issued or originated from the equipment unit in the monitor center is used as the content code for retrieving a delayed train. When equipment units, provided respectively in all stations receive the delayed train retrieval command, each of the equipment units retrieves its own train pursuit file for information with respect to the delayed train. The train pursuit file in each equipment unit stores therein the state of a train running between the station provided with the equipment unit and a station located immediately behind the above station. Further, when the above-mentioned train pursuit files are retrieved for a standing train at each station, a standing train report command is used as the content code, and the train number of the standing train at each station is looked up in the train pursuit files. As is apparent from the above explanation, the content code is used to gather data of the same kind and having a common concept from a plurality of equipment units in one time.

In fact, a retrieval request is processed in the following manner. Referring to FIG. 2, let us consider the case where the retrieval request is issued or originated from an equipment unit 11. That is, let us assume that a predetermined input is keyed in by an operator with an input-/output device 40 provided in the equipment unit 11. In this case, an information processing device 30 in the equipment unit 11 receives the keyed-in input. In more detail, a processing unit 32 in the information processing unit 30 receives this input through an interface 33. A memory unit 34 in the information processing device 30 has a structure such as shown in FIG. 4. Referring to FIG. 7B, the memory unit 34 receives a request from the input/output device 40 (step 720), and judges whether the request is a retrieval request or not (step 721). When the request is a retrieval request, the processing unit 32 retrieves an area 341 for storing content codes for use in the retrieval to select a content code C specified by the input key (step 722). The selected content code C is sent through an interface 31 to a processing unit 22 in a transmission control device 20 (step 723).

A memory unit 24 in the transmission control device 20 has such a structure as shown in FIG. 3. Referring to FIG. 7C, when the processing unit 22 in the transmission control device 20 receives the content code C through an interface 23 (step 730), the processing unit 22 judges whether the received data contains only the content code C or not (step 731). In the case where only the content code is contained in the received data, information "11" which is stored in an equipment unit address storing area 241 in the memory unit 24, and information "0" which is stored in an area 242 for storing a serial number of transmitted data, are read out, and a retrieval request message SM having such a format as shown in FIG. 6 is formed (step 732). Since any message M is not yet transmitted from the equipment unit 11, the serial number in the area 241 is "0". The retrieval request message SM includes areas 401, 402, 403 and 404. The area 401 is used to store therein the content code C, and the area 402 is used to store therein the address SA of the message originating equipment unit. In this case, the above-mentioned information "11" is set in the area 402 as the address SA. The area 403 is used to store therein the serial number DA of transmitted data. In this case, a numeral "1" is added to the above-mentioned information "0", and the result "1" of the addition is set in the area 403. At this time, the value in the serial number storing area 242 is increased by one to provide for the transmission of another message. The area 404 is used to store therein a retrieval editing requesting bit SC. In this case, numeral "1" is set in the area 404. The bit SC indicates the retrieval request or editing request depending on whether the bit is equal to 1 or 0. The retrieval request message SM having the above-mentioned areas 401, 402, 403 and 404 is set in a transmitting buffer area 244 in the memory unit 24 (step 733 shown in FIG. 7C).

The processing unit 22 adds flags F to the first and last portions of the retrieval request message SM which is stored in the transmitting buffer area 244 and has a fixed length, and then sends the message SM to the transmission line through an interface 21.

The retrieval request message thus transmitted goes through equipment units 12, 13, . . . , and 1n along the transmission line 1, and then returns to the equipment unit 11.

The returned message SM is supplied to the transmission control device 20 of the equipment unit 11. The processing unit 22 in the transmission control device 22 receives the message SM through the interface 21, and derives from the message SM the address SA of the message transmitting equipment unit and the serial number DA which have predetermined positional relations with the leading flag F. Then, the address SA of the message transmitting equipment unit is compared with the address stored in the equipment unit address storing area 241. In this case, these addresses are identical with each other. Thus, it is detected that the message SM has been sent out from the equipment unit 11. Since the message SM has been transmitted from the equipment unit 11, it is not required to transfer the message SM. That is, the message SM is not sent to the equipment unit 12. Next, it is judged whether a message having the same serial number as the serial number DN of the received message is stored in the transmitting buffer area 244 or not. In this case, since the same message SM as the received message is stored in the area 244, the serial number of the received message coincides with that of the stored message. The message SM which is stored in the area 244 and coincides with the received message, becomes unnecessary and is erased from the area 244, because it is judged that the message has been sent to all of the other equipment units.

In the case where the message SM is not yet erased from the transmitting buffer area 244 even when a predetermined time has elapsed after the transmission of the message SM, it is judged by the processing unit 22 that the message SM has not returned to the equipment unit 11, and the message SM is sent again.

The serial number DN is used to discriminate among messages transmitted from the same equipment unit. That is, when an equipment unit transmits a plurality of messages, the serial number DN is used to determine a message which has not yet returned to the equipment units.

(2) Retrieval Processing

Figure 7B:
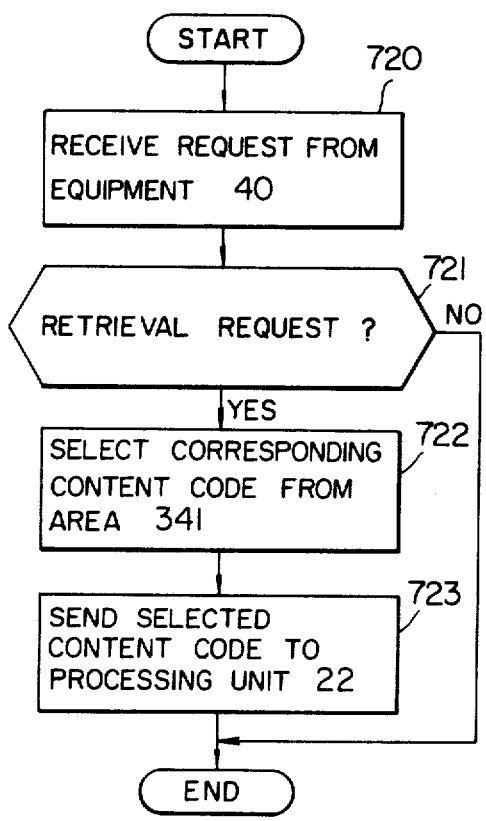
FIG. 7B is a flow chart for explaining a request inputting operation.
Figure 7C:
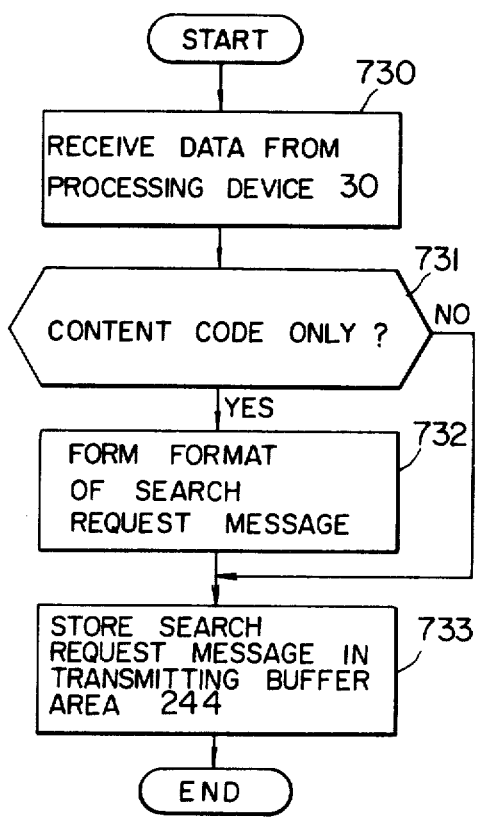

Referring to FIG. 7A, the transmission control device 20 in each of the equipment units 12, 13, . . . and 1n other than the retrieval requesting equipment 11 receives the above-mentioned retrieval request message SM (step 701), and it is judged whether the message has been transmitted from the received equipment unit or not (step 702). In more detail, the processing unit 22 in the transmission control device 20 receives the message SM (having the structure shown in FIG. 6) through the interface 21. The address SA of message transmitting equipment unit, which is arranged at a predetermined distance from the leading flag F, is taken out from the message SM, and is compared with the address of the received equipment unit which is stored in the area 241 in the memory unit 24. In this case, these addresses are different from each other. The message SM is transferred to the downstream of the transmission loop (step 703), and further it is judged whether a message having the same address SA and serial number as the received message SM is stored in a receiving buffer area 243 or not (step 704). In this case, no message is stored in the area 243, and therefore it is judged that the same message as the received message is not stored in the area 243. That is, it is known that the message SM is a first received message. Next, it is judged whether the message SM should be processed in the received equipment or not, that is, it is judged whether the content code in the message SM has been recorded in a content code table storing area 245 or not (step 705). The area 245 in each equipment unit stores therein a plurality of content codes which should be processed in the equipment unit. Now, let us assume that the same content code as the content code in the message SM is recorded in the area 245 in each of the equipment units 12, 13 and 14 but is not recorded in the area 245 in each of the equipment units 15, 16, . . . and 1n.

In the above case, the result of judgement in step 705 is "YES" only in the equipments 12, 13 and 14. Accordingly, the message SM is stored in the receiving buffer area 243 in each of the equipment units 12, 13 and 14 (step 706) but is not stored in the area 243 in each of the equipment units 15, 16, . . . and 1n.

The processing unit 22 in each of the equipment units 12, 13 and 14 informs the processing unit 32 that not all of the message has been read out from the receiving buffer area 243. Referring to a flow chart shown in FIG. 8, the processing unit 32 commands the processing unit 22 to read out the message SM from the receiving buffer area 243 (step 801). The processing unit 22 reads out the message SM from the area 243, and transfers the message SM to the processing unit 32. Further, the processing unit 22 erases the message SM from the area 243. However, the address SA of the message transmitting equipment unit and the serial number DN of the message SM are held in the area 243 for a predetermined time and then erased, in order to prevent each of the equipment units 12, 13 and 14 from receiving the same message as the message SM twice or more.

It is judged by the processing unit 32 whether the retrieval/editing requesting bit SC of the message SM is "1" or not (step 802). As mentioned previously, the bit SC has been set for "1" in the equipment unit 11, and therefore the processing unit 32 enters into the searching operation (step 803).

The external memory device 50 in each equipment unit has such a file structure as shown in FIG. 5. That is, the memory device 50 stores therein data D and connection information JF for connecting the data D (namely, left end connection information LJF and right end connection information RJF), in addition to the content code C. In more detail, the left end connection information LJF indicates the name of a file storing therein data which is to be connected with the left end of the above-mentioned data D, and the right end connection information RJF indicates the name of a file in which data to be connected with the right end of the data D is stored. When a symbol "FN" is recorded in the connection information LJF or RJF, it is indicated that there is no data to be connected with the left or right end of the data D.

Now, let us consider the case where the name of the file in the external memory device 50 of the equipment 12, the name of the file in the device 50 of the equipment unit 13 and the name of the file in the device 50 of the equipment unit 14 are expressed by $f_A$, $f_B$ and $f_C$, respectively, data to be detected are given by $D_A$, $D_B$ and $D_C$, and these data $D_A$, $D_B$ and $D_C$ should be connected in the form of "$D_A D_B D_C$". In this case, respective external memory devices 50 of the equipment units 12, 13 and 14 store such information as shown in FIG. 9. That is, the external memory device 50 of the equipment 12 stores therein the content code C, the $D_A$ corresponding to the content code C, the symbol FN indicating that any data to be connected with the left end of the data $D_A$ does not exist, and the name $f_B$ of the file which stores data to be connected with the right end of the data $D_A$. Respective external memory devices 50 of the equipment units 13 and 14 store similar information, as shown in FIG. 9. As mentioned above, the connection information JF required to edit the data $D_A$, $D_B$ and $D_C$ is not concentrated on one equipment unit but is distributed among and stored in the equipment units 12, 13 and 14.

Turning back to the retrieval operation in step 803, the processing units 32 of the equipment units 12, 13 and 14 retrieve the files $f_A$, $f_B$ and $f_C$, respectively, on the basis of the content code C in the message which has been read out of the receiving buffer area 243. As can be seen from FIG. 9, the processing unit 32 of the equipment unit 12, that of the equipment 13 and that of the equipment unit 14 retrieve information including FN, $f_B$ and $D_A$, information including $f_A$, $f_C$ and $D_B$, and information including $f_C$, FN and $D_C$, respectively. Further, each processing unit 32 takes out the address SA of the equipment unit having transmitted the message SM and the serial number DN in order to use them as the address SOA of and the serial number SODA in the retrieval requesting equipment unit, respectively.

In the equipment unit 12, the processing unit 32 stores information (C, SOA, SODA, FN, $f_B$ and $D_A$) in a retrieved data information storing area 342 (step 804). Similarly, information (C, SOA, SODN, $f_A$, $f_C$ and $D_B$) and information (C, SOA, SODN, $f_C$, FN and $D_C$) are stored in the area 342 of the equipment unit 13 and the area 342 of the equipment unit 14, respectively.

In the equipments 12, 13 and 14, the above-mentioned information is sent from the processing unit 32 to the transmission control device 20 (step 805).

The processing unit 22 in the transmission control device 20 receives the information, and forms such a message as shown in FIG. 10. The message formed is stored in the transmitting buffer area 244. In more detail, the message includes areas 401, 402, ... and 409. The content code C of the above-mentioned retrieved information is set in the area 401, and the equipment unit address SA read out of the area 241 is set in the area 402. A value obtained by adding 1 (one) to the serial number DN read out of the area 242 is set in the area 403, and the value in the area 242 is increased by 1 (one) immediately after the serial number DN has been read out. A numeral "0" is set in the area 404. When the retrieval/editing requesting bit SC is "0", it is indicated that the message is an edit request message. The address SOA of the retrieval requesting equipment, the serial number SODN in the retrieval requesting equipment unit, the left end connection information LJF and right end connection information RJF of the received information, and the retrieved data D are set in the areas 405, 406, 407, 408, and 409, respectively. The message thus set is stored in the transmitting buffer area 244. The processing unit 22 sends the message to the transmission loop 1 in the same manner as the case where the previously-mentioned retrieval request message SM is sent out.

Figure 11A:
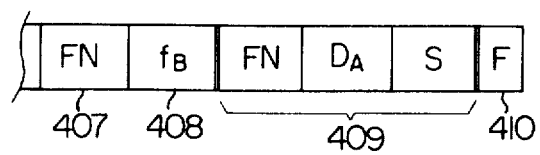
FIGS. 11A to 11F show messages with data transmitted from a plurality of equipment units each shown in FIG. 2.
Figure 11B:
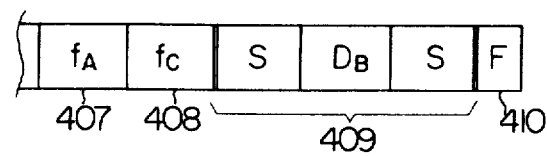
Figure 11C:
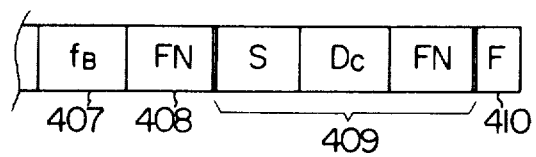

Thus, messages shown in FIGS. 11A, 11B, and 11C are sent from the equipment units 12, 13 and 14 to the transmission loop 1. In FIGS. 11A to 11F, parts corresponding to the areas 401 to 406 shown in FIG. 10 are omitted for brevity's sake. When each of such messages returns to the equipment unit having transmitted the message, the transfer thereof is stopped (step 707), and a message having the same serial number as the returned message is erased from the transmitting buffer area 244 (step 708). Incidentally, the data $D_A$, $D_B$ and $D_C$ in the area 409 are retrieval data, the symbol FN indicates that a connection with the retrieval data is not required, and the symbol S indicates that the retrieval data is to be connected with other data. The symbols FN and S are set in accordance with the connection information LJF and RJF.

(3) Editing Processing

Figure 8:
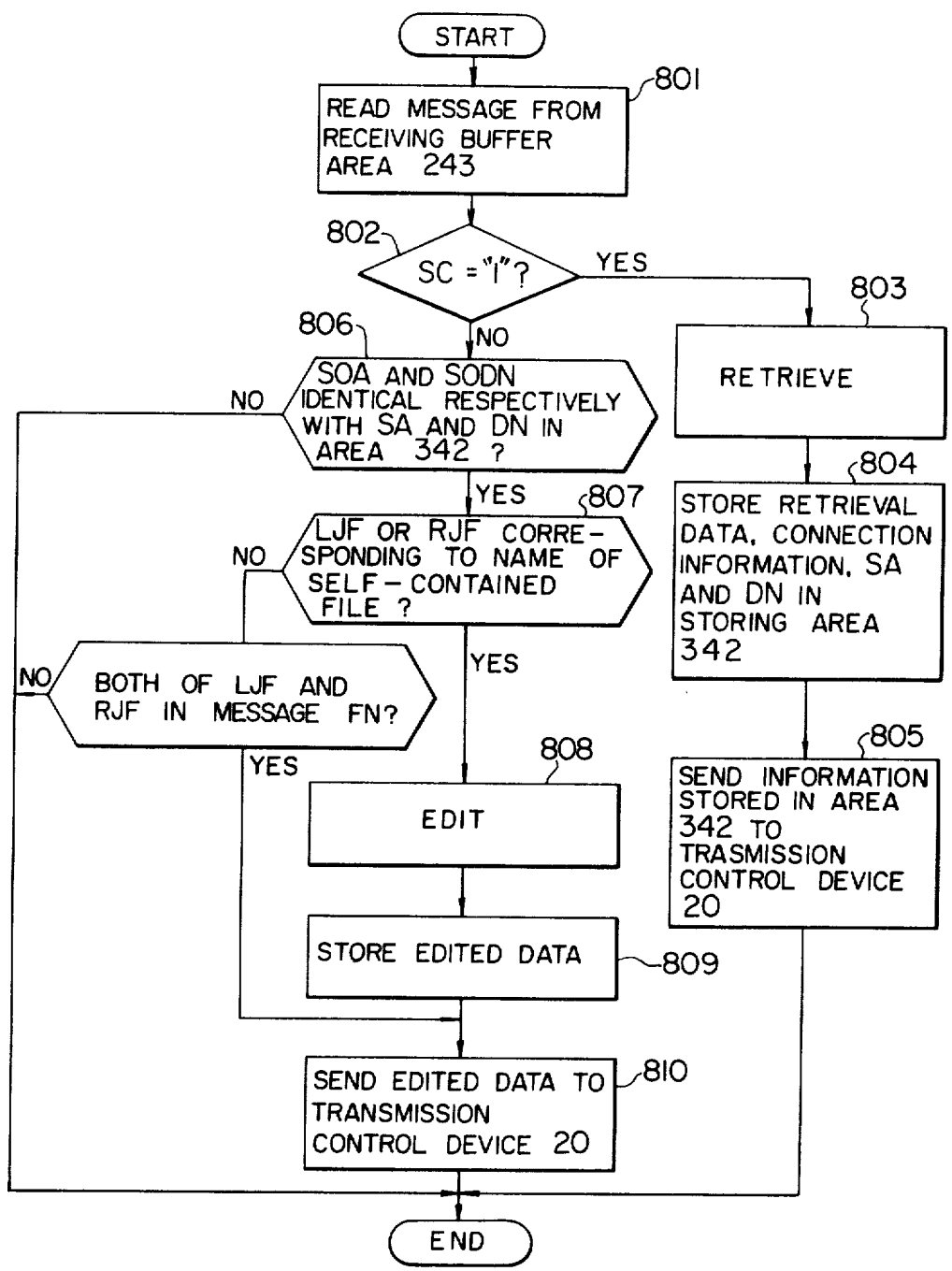
FIG. 8 is a flow chart for explaining the processing steps in the information processing device 30 shown in FIG. 2.

A copy of the message as shown in FIG. 11A is sent out from the equipment unit 12, and is stored in the receiving buffer area 243 of the equipment unit 13 in accordance with the flow chart shown in FIG. 7A. Referring to FIG. 8, the message stored in the area 243 is read out (step 801) and transferred to the processing unit 32, in the same manner as mentioned previously. It is judged whether the retrieval/editing requesting bit SC of the message is "1" or not (step 802). In this case, the bit SC is "0", and therefore it is decided that the message is an editing request message. Then, it is judged whether the address SOA of retrieval requesting equipment unit and the serial number SODN contained in the message are coincident respectively with the address SOA and serial number SODN stored in the detected data storing area 342, or not (step 806). In this case, the same address SOA and serial number SODN as contained in the message are stored in the area 342. Further, it is judged whether a file specified by the left end connection information LJF or right end connection information RJF is coincident with the name $f_s$ of the self-contained file recorded in the memory unit 34 (step 807). In this case, the right end connection information RJF is "$f_B$", and the symbol "$f_B$" is recorded in an area 344 of the equipment 13. That is, the above-mentioned two files coincides with each other. Thus, the processing unit 32 detects that the retrieval data $D_B$ stored in the area 342 is to be connected with the right end of the data $D_A$ in the received message. The processing unit 32 transfers the message to an editing operation area 343 to edit this message and the information in the area 342 (step 808). In more detail, since the right end of the received message is connected to information in this case, the symbol FN recorded in the area 407 of the received message shown in FIG. 11A is set in the area for storing the left end connection information LJF of combined information (namely, edited information) to be formed. The right end connection information $f_C$ stored in the area 342 is set in the area for storing the right end connection information RJF of the edited information to be formed. Further, data "$D_A D_B$", which is obtained by connecting the data $D_B$ stored in the area 342 to the right end of the data $D_A$ contained in the received message, is set in the data area of the edited information to be formed. Thus, information (including C, SOA, SODN, FN, $f_C$ and $D_A D_B$) is formed, and is stored as edited data in a part of the area 343 (step 810). The information thus formed is sent to the transmission control device 20, and is converted into the message shown in FIG. 11D in the same manner as mentioned previously. The message thus obtained is stored in the transmitting buffer area 244, and a copy of the message is sent to the transmission loop 1.

Figure 11D:
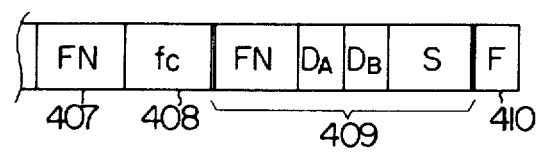
Figure 11E:
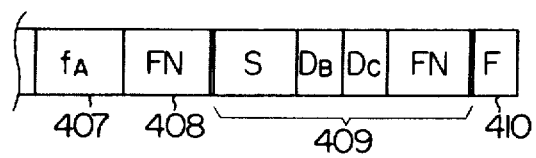

The same editing processing as in the equipment unit 13 is carried out in the equipment unit 14, and the message shown in FIG. 11E is sent from the equipment unit 14 to the transmission loop 1.

When the message shown in FIG. 11C is sent from the equipment unit 14 to the equipment unit 12, it is detected that the connection information $f_B$ and FN in the message are different from the name $f_A$ of the file contained in the equipment unit 12 (step 807), and therefore no editing processing is carried out in the equipment unit 12.

Next, when the message shown in FIG. 11D is sent from the equipment unit 13 to the equipment unit 14, editing processing is carried out in the equipment unit 14 in the same manner as mentioned above. Thus, the message shown in FIG. 11F, namely, the completely-edited message is sent from the equipment unit 14 to the transmission loop 1, and is erased after it has circulated through the transmission loop 1 one time.

As mentioned above, editing processing is carried out in such a manner as being distributed among a plurality of equipment units, on the basis of connection information which is distributed among and stored in a plurality of equipment units. In the final stage, an editing completion message will be sent to the transmission line 1.

(4) Editing Completion Data Receiving Processing

Each of the equipment units 11 to 1n is provided with an area 247 in order to take in, if necessary, information whose editing is completed in its own information processing unit 30. In more detail, the content code of an editing completion message to be taken in is previously set in the area 247, or is set in the area 247 with the input/output device 40 at need. Now, let us assume that the same content code C as contained in the above-mentioned editing completion message is set in the retrieval requesting equipment unit 11 and an independent equipment unit 1n (step 709).

Figure 11F:
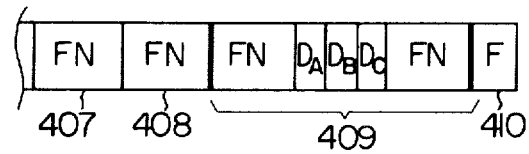

When the processing unit 22 of each equipment unit detects that both of the left end connection information LJF and right end connection information RJF in the message which is received from the transmission loop 1 and has the structure shown in FIG. 11F, are FN (step 710) and therefore the received message is an editing completion message, the processing unit 22 erases, if any, the whole of information concerning the retrieval/editing processing specified by the content code C, the address SOA of the retrieval requesting equipment unit and the serial number SODN which are contained in the received message, and the specified retrieval/editing processing is stopped (step 711). Further, it is judged whether the content code C of the above-mentioned editing completion message is set in the area 247 or not.

In this case, it is detected only in the equipment units 11 and 1n that the above-mentioned content code C is set in the area 247. In each of the equipment units 11 and 1n, the editing completion message is sent to the input/output device 40 through the processing units 22 and 32, and is displayed on the display screen of the input/output device 40.

FIG. 12 shows an improved version of the processing procedure carried out by the processing unit 32. The processing procedure shown in FIG. 12 is characterized in that the step 805 shown in FIG. 8 is changed to steps 820, 821 and 822, while leaving the remaining steps unchanged. In more detail, according to the flow chart shown in FIG. 8, when a retrival operation is completed, information obtained is stored in the area 342 (step 804), and the stored information is always sent to the transmission control device 20 (step 805). On the other hand, according to the flow chart shown in FIG. 12, it is judged whether the stored information is to be sent to the device 20 without being edited or is to be edited before the sending.

In general, a time required for retrieval varies with the equipment units. Accordingly, when the retrieval processing in an equipment unit terminates, data to be connected with the data retrieved by the above retrieval processing has been received by the equipment unit in some cases. In these cases, it is advantageous to edit the detected and received data and to send out the edited data, as compared with the case where the detected data is sent out without being edited, because a time required for the edit processing to be completed can be made shorter.

In more detail, when the processing in step 804 has been completed, it is judged whether a message having the same retrieval requesting equipment unit address SOA and serial number SODN as stored in the area 342 has been received or not, that is, it is judged whether the above message has been stored in the receiving buffer area 243 (step 820). When the message is not stored in the area 243, the retrieved data is sent to the device 20 without being edited (step 822), since any message to be connected with the retrieved data is not yet received. When the message is stored in the area 243, it is judged whether the connection information LJF or RJF in the message is the name of self-contained file or not (step 821). When the name of self-contained file is not pointed out, the retrieved data is sent to the device 20 without being edited (step 822), since a message to be connected with the retrieved data is not yet received. When the name of self-contained file is pointed out, an editing operation is performed (step 808), since the message stored in the area 243 is to be connected with the retrieved data. That is, data in the stored message and the retrieved data are connected with each other, and the combined data (namely, edited data) is sent to the device 20 (step 810).

Further, in the case where a plurality of messages have the same address SOA and serial number SODN as stored in the area 342 and the connection information LJF or RJF of each message is the name of self-contained file, the newest message is selected, and data in the selected message is connected with the retrieved data to send out the edited data.

As has been explained in the foregoing description, the present invention has the following advantages.

(a) The load with respect to editing is not concentrated on a retrieval requesting equipment. In other words, editing is carried out distributively among a plurality of equipment units.

(b) Information required for editing can be distributed among a plurality of equipment units.

(c) Editing is carried out in a plurality of equipment units at the same time, that is, parallel processing is performed. Therefore, a time required for editing can be made shorter.

(d) In the case where the content code is sent to each equipment unit, no destination table is required and it is not required to previously know which of a plurality of equipment units stores data to be detected. Further, a one-to-multi equipment unit communication can be readily carried out.

We claim:

1. A method of retrieving and editing distributed information, in which one of a plurality of equipment units connected to a common signal transmission line issues a retrieval request to retrieve data information distributed among and stored in respective files of the other equipment units and to edit said distributed data information, comprising the steps of:

sending a retrieval request message from said one equipment unit to said common signal transmission line, said retrieval request message containing retrieval information necessary to retrieve said distributed data information;

receiving said retrieval request message by each of said equipment units storing therein said distributed data information, through said common signal transmission line, and retrieving a file of said each equipment unit on the basis of said retrieval information to retrieve said distributed data information;

sending data information retrieved in at least a first one of said equipment units storing therein said distributed data information to said common signal transmission line; and receiving said data information detected in said first equipment unit, from said common signal transmission line, in at least two of said equipment units which store therein said distributed data information, wherein said at least two equipment units edit said received data information from said first equipment unit together with data information retrieved in said two equipment units and wherein said at least two equipment units send the edited data information to said common signal transmission line.

2. A method of retrieving and editing distributed information, in which one of a plurality of equipment units connected to a common signal transmission line issues a retrieval request to retrieve data information distributed among and stored in respective files of the othr equipment units and to edit said distributed data information, comprising the steps of:

sending a retrieval request message from said one equipment unit to said common signal transmission line, said retrieval request message containing retrieval information necessary to retrieve said distributed data information;

receiving said retrieval request message by each of said equipment units storing therein said distributed data information, through said common signal transmission line, and retrieving a file of said each equipment unit on the basis of said retrieval information to retrieve said distributed data information;

sending data information retrieved in at least a first one of said equipment units storing therein said distributed data information to said common signal transmission line;

receiving said data information retrieved in said first equipment unit at at least a second one of said equipment units storing therein said distributed data information, through said common signal transmission line, wherein said second equipment unit edits said received data information from said first equipment unit and data information retrieved in said second equipment unit and sends the edited data information to said common signal transmission line; and receiving said data information edited in said second equipment unit at at least a third one of said equipment units storing therein said distributed data information, through said common signal transmission, wherein said third equipment unit edits said received, edited data information from said second equipment unit together with data information retrieved in said third equipment unit and sends the edited data information thus obtained to said common signal transmission line.

3. A method of retrieving and editing distributed information, in which a plurality of equipment units each having a file to store therein data information pieces are connected to a common signal transmission line, wherein one of said equipment units issues a retrieval request to retrieve data information distributed among and stored in respective files of the other equipment units and to edit said distributed data information pieces, said method comprising the steps of:

sending a retrieval request message from one of said equipment units to said common signal transmission line, said retrieval request message containing retrieval information necessary to retrieve particular pieces of data information to be edited, said particular data information pieces being distributed in at least two other equipment units;

in each of said at least two other equipment units which stores therein said particular data information pieces, receiving said retrieval request message through said common signal transmission line, and retrieving data information pieces from its own file on the basis of said retrieval information;

in at least one of said two equipment units which stores therein said particular data information pieces, sending the retrieved data information piece retrieved to said common signal transmission line; and in at least another one of said two equipment units which stores therein said particular data information pieces, receiving said retrieved data information piece from said common signal transmission line and editing said received, retrieved data information piece and data information retrieved from its own file and sending the edited data information pieces to said common signal transmission line.

4. A method according to claim 3, wherein at least one of said equipment units which stores therein said particular data information pieces, other than said at least another one of said two equipment units, receives said edited data information pieces through said common signal transmission line, and further edits said received, edited data information pieces and data information pieces retrieved from its own file and sends the thus edited data information pieces to said common signal transmission line.

5. A method of retrieving and editing distributed information, in which a plurality of equipment units each having a file to store therein data information pieces are connected to a common signal transmission line, wherein one of said equipment units issues a retrieval request to retrieve data information distributed among and stored in respective files of the other equipment units and to edit said distributed data information pieces, comprising:

a first step of sending a retrieval request message from one of said equipment units to said common signal transmission line, said retrieval request message containing retrieval information necessary to retrieve particular pieces of data information to be edited, said particular data information pieces being distributed in at least two other equipment units;

a second step, in each of said at least two other equipment units which store therein said particular data information pieces, of receiving said retrieval request message through said common signal transmission line, and retrieving data information pieces from its file on the basis of said retrieval information;

a third step, in each of said equipment units which store therein said particular data information pieces, (i) of sending the retrieved data information piece to said common signal transmission line when the retrieval of data information piece therein has been finished before receipt of any data information piece to be edited with said retrieved data information piece, subsequently editing said retrieved data information piece with any data information piece to be edited with said retrieved data information piece upon its receipt and then sending the thus edited data information pieces to said common signal transmission line, or (ii) of editing said retrieved data information piece with any data information piece to be edited with said retrieved data information piece when the retrieval of said data information piece is finished after receipt of the to-be-edited data information piece and sending the thus edited data information pieces to said common signal transmission line;

a fourth step, in at least one of said equipment units storing therein said particular data information pieces, of receiving any data information piece to be edited with a data information piece retrieved therefrom from said signal transmission line, the to-be-edited information piece being sent to said signal transmission line from an equipment unit different from said receiving at least one equipment unit; and a fifth step, in one of said plurality of equipment units, of receiving completely edited data information pieces through said common signal transmission line.

6. A method according to claim 5, wherein one selected from content code classified previously in accordance with the contents of retrieval is sent without having respective addresses of receiving equipment units to said common signal transmission line in said first step, and wherein, in said second step, it is judged whether the content code received from said common signal transmission line is coincident with one of a plurality of previously recorded content codes or not and said files of said equipment units are searched to retrieve particular data information pieces specified by said received content code only when said received content code coincides with one of said previously recorded content codes.

7. A method according to claim 5 or 6, wherein said third step includes a step of sending said retrieved or edited data information pieces to said common signal transmission line together with the name of a file storing therein data information piece to be connected with at least one of the left and right ends of said retrieved or edited data information pieces when said any data information piece is to be connected therewith, for edition, while sending said retrieved or edited data information pieces to said common signal transmission line together with left end connection information and right end connection information each given a predetermined flag indicative of non-connection with said retrieved or edited data information pieces when said any data information piece is not to be connected therewith, and wherein in said fifth step, it is judged whether both of said left end connection information and said right end connection information are said predetermined flag or not and said one equipment unit receives said transmitted data information piece together with said left end connection information and said right end connection information, when both of said left end connection information and said right end connection information are said predetermined flag.

8. A method of retrieving and editing information distributed among a plurality of equipment units connected to a common signal transmission line, comprising:

a first step of sending a retrieval request message by one of said equipment units to said common signal transmission line, said retrieval request message containing retrieval information necessary to retrieve pieces of data information stored in at least one of the other equipment units;

a second step including receiving said retrieval request message by said at least one equipment unit through said signal transmission line, retrieving a data information piece corresponding to said retrieval request message in said at least one equipment unit, editing said retrieved data information piece with at least a part of said retrieval request message in said at least one equipment unit, and sending the result of the edition from said at least one equipment unit to said signal transmission line at least when a requested edition of data information pieces is not finished; and a third step including receiving a data information piece sent from any one of said equipment units by each of said at least one equipment units through said signal transmission line, determining in said each of said at least one equipment units whether it has any data information piece stored that is to be edited with said received data information piece, editing in said each of said at least one equipment units the data information piece retrieved therefrom with said received data information piece when the retrieved and received data information piece are to be edited with each other, and sending the result of edition from said at least one equipment unit to said signal transmission line at least when the requested edition of data information pieces is not finished, at least one of said second and third steps being executed at least once in said at least one equipment unit to complete said requested edition.

9. A method according to claim 8, in which when the editing in one of the second and third steps results in a finish of said requested edition of data information pieces, a code indicative of the finish of edition is attached to the result of said edition for sending to said signal transmission line along with the finished data information pieces.

10. A method according to claim 8, further comprising the step of taking in, among data information pieces on said signal transmission line, edited data information pieces having undergone the requested edition as information required in one of said equipment units.

11. A method according to claim 8, in which, in said third step, when the retrieval of the data information piece has been finished before receipt of any data information piece to be edited with said retrieved data information piece, said retrieved data information piece is sent to said signal transmission line and subsequently any data information piece to be edited with said retrieved data information piece is upon its receipt so edited and the thus edited information pieces are sent to said signal transmission line, while when the retrieval of said data information piece is finished after receipt of the to-be-edited data information piece, said retrieved data information piece is edited with said to-be-edited data information piece and the thus edited data information pieces are sent to said signal transmission line.

12. A method according to claim 8, in which, in said first step, at least one selected from content code classified previously in accordance with the contents of retrieval is sent to said common signal transmission line, and in said second step, it is judged whether the content code received from said common signal transmission line is coincident with one of a plurality of previously recorded content codes or not and said equipment units are searched to retreive particular data information pieces specified by said received content code only when said received content code coincides with one of previously recorded content codes.

13. A method according to claim 8, in which, in said third step, said retrieved or edited data information pieces are sent to said common signal transmission line together with the name of a file storing therein a data information piece to be connected with at least one of the left and right ends of said retrieved or edited data information pieces when said any data information piece is to be connected therewith for edition, while said retrieved or edited data information pieces are sent to said common signal transmission line together with left end connection information and right end connection information each given a predetermined flag indicative of nonconnection with said retrieved or edited data information pieces when said any data information piece is not to be connected therewith.

14. A method according to claim 13, in which, in said third step, it is judged whether both of said left end connection information and said right end connection information are said predetermined flag or not and said one equipment unit receives said transmitted data information together with said left end connection information and said right end connection information, when both of said left end connection information and said right end connection information are said predetermined flag.

* * * * *